United States Patent [19]

Vincent

[11] 4,414,783
[45] Nov. 15, 1983

[54] COOLANT SYSTEM FOR ROTATING BLADE CUTTER

[75] Inventor: Donald P. Vincent, Lake Zurich, Ill.

[73] Assignee: Buehler Ltd., Lake Bluff, Ill.

[21] Appl. No.: 294,379

[22] Filed: Aug. 19, 1981

[51] Int. Cl.³ .................. B24B 55/02; B24B 55/04
[52] U.S. Cl. ............................... 51/267; 408/60;
409/136; 83/169; 83/171; 29/DIG. 86;
29/DIG. 87
[58] Field of Search ............... 51/267, 268, 91 R;
408/56, 60; 409/134, 136; 29/DIG. 63, DIG.
87, DIG. 86, DIG. 88, DIG. 91; 83/169, 171;
30/123.3, 123.4

[56] References Cited

U.S. PATENT DOCUMENTS 647,413 4/1900 Johnson ............................ 51/267
2,462,710 2/1949 Ballinger .......................... 51/267

*Primary Examiner*—Roscoe V. Parker
*Attorney, Agent, or Firm*—Charles F. Pigott, Jr.

[57] ABSTRACT

A coolant system for use with a cutter of the type having a vertically disposed rotatable cutter wheel for cutting metallurgical samples and other objects. Such a cutter has a motor-driven rotatable abrasive or metal cutting wheel or blade, and a workpiece holder which holds a specimen workpiece from which a section is to be sliced off. Either the cutter wheel or the workpiece holder is movable to bring the workpiece into engagement with the cutter wheel. The coolant system is combined with a blade guard which covers a major portion of the rotatable cutting blade for safety reasons, and the coolant system distributes a coolant fluid in an advantageous manner onto the center of the vertically disposed rotating cutting blade on both sides thereof so as to bathe the workpiece over the entire cutting area. The coolant system is primarily intended for use with a cutter of the type where the workpiece is moved into engagement with the cutter wheel during a cutting operation.

8 Claims, 8 Drawing Figures

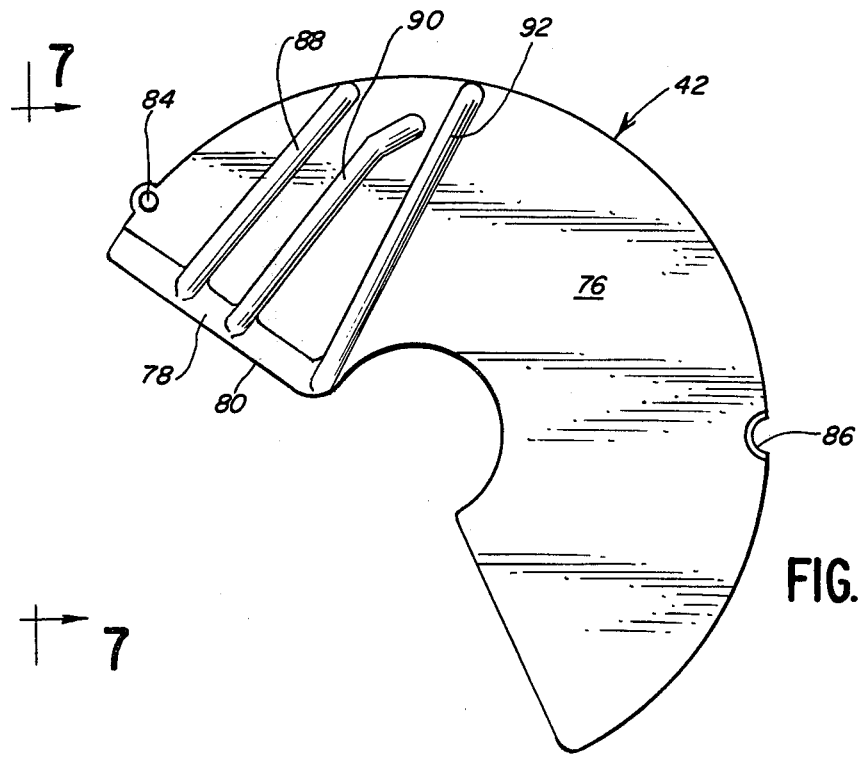
FIG. 6
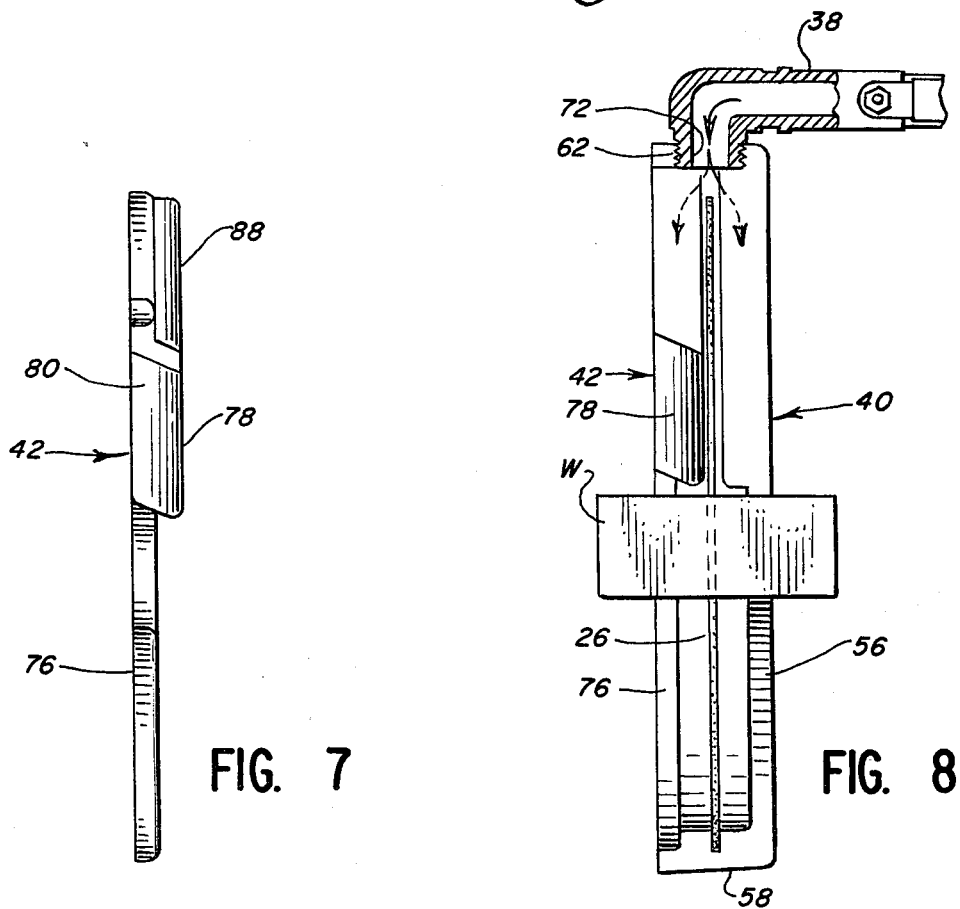
FIG. 7
FIG. 8

COOLANT SYSTEM FOR ROTATING BLADE CUTTER

BRIEF SUMMARY OF THE INVENTION

It is of course common to provide a coolant system in conjunction with a rotating blade type cutter in order to dissipate heat produced by a cutting operation and prevent damage to the workpiece and the cutting blade. However, previously known coolant systems used with rotating blade type cutters have suffered certain disadvantages which the present invention has eliminated.

Many known coolant systems used with rotating blade cutting machines utilize a flexible tube or the like which an operator manually directs as a workpiece is moved during a cutting operation, the objective being to keep a stream of coolant liquid trained on the moving workpiece. Such systems thus require certain flexible connections, and they also require an operator to redirect the coolant stream after the cutting operation has commenced.

Certain other types of coolant systems are known, but in general they do not distribute a stream of coolant liquid over a wide area on both sides of a rotating cutting blade or wheel so as to thoroughly bathe the workpiece being cut as the workpiece moves from one position to another during a cutting operation.

It is therefore a principal object of my invention to provide an improved coolant system for a rotating blade cutter which directs a stream of coolant fluid over a wide area onto the center of a vertically disposed rotating cutting blade on both sides of the blade so as to bathe a workpiece being cut as the latter moves through the cutting area.

It is another object of the invention to incorporate my improved coolant distribution system into a blade guard assembly which is required for safety reasons to cover a major portion of the rotatable cutter blade.

The foregoing and other objects and advantages of the invention will be apparent from the following description of a preferred embodiment, taken in conjunction with the accompanying drawings.

DESCRIPTION OF THE DRAWINGS

FIG. 6 is a fragmentary detail elevational view showing the inside of the left-hand half of the blade cover of FIG. 3 so as to illustrate vanes cast on the inside wall of the blade guard;

FIG. 7 is a detail front elevational view of the left-hand half of the blade cover looking approximately in the direction of the arrows 7—7 of FIG. 3; and FIG. 8 is a schematic view looking substantially in the direction of the arrows 8—8 of FIG. 4 and showing the manner in which coolant fluid is divided so as to flow on both sides of a vertically disposed rotatable cutting blade.

Now, in order to acquaint those skilled in the art with the manner of making and using my invention, I shall describe, in conjunction with the accompanying drawings, a preferred embodiment of the invention.

DETAILED DESCRIPTION OF THE INVENTION

Figure 1:
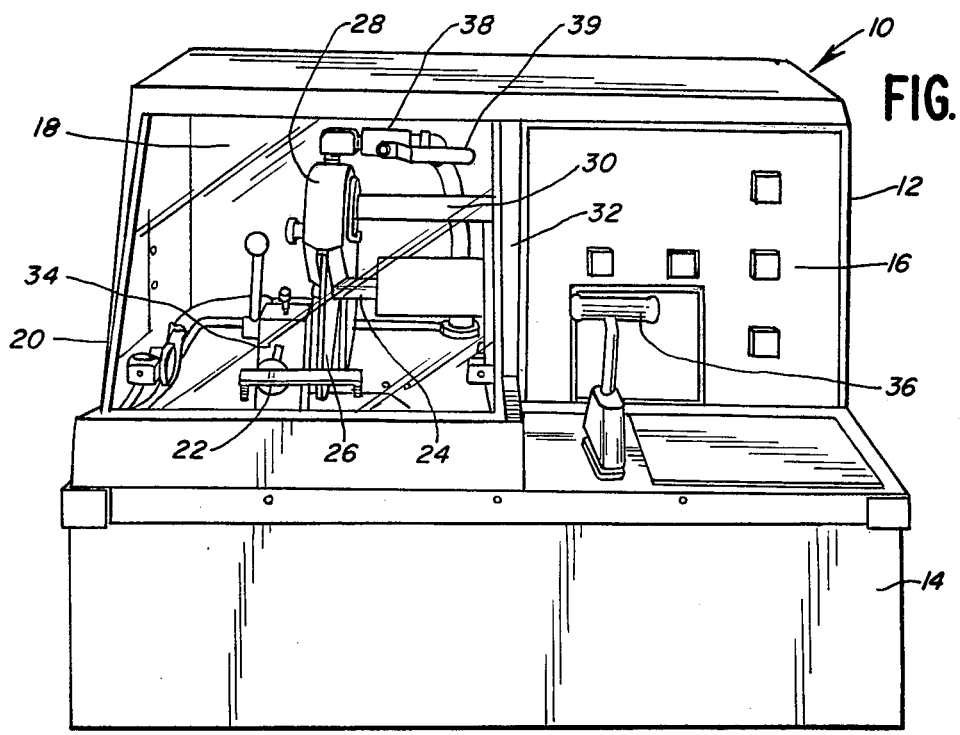
FIG. 1 is a perspective view of a rotating blade type cutter including a coolant system designed in accordance with the present invention.

Referring now to the drawings, FIG. 1 shows a rotating blade type cutter 10 including an upper housing 12, a lower housing 14, a control panel 16, a cutting chamber 18, a transparent plastic access door 20 which covers the cutting chamber 18 and may be opened by using a door handle 22, a cutter wheel spindle 24, and a vertically disposed motor-driven cutting wheel or blade 26.

There is also shown in FIG. 1 a blade cover or wheel guard assembly 28 supported from a wheel guard support shaft 30 which is secured from an upright side wall 32 of the housing. A vise 34 holds a workpiece to be cut, and the vise is mounted on a platform (not shown) which is movable forwardly and rearwardly along a horizontal path under the control of a manually operable lever 36 to bring a workpiece into engagement with the cutting blade 26 and to subsequently withdraw the workpiece. It will further be noted that a coolant supply tube 38 is connected to the upper portion of the blade cover assembly 28, and a coolant valve handle is shown at 39.

Figure 2:
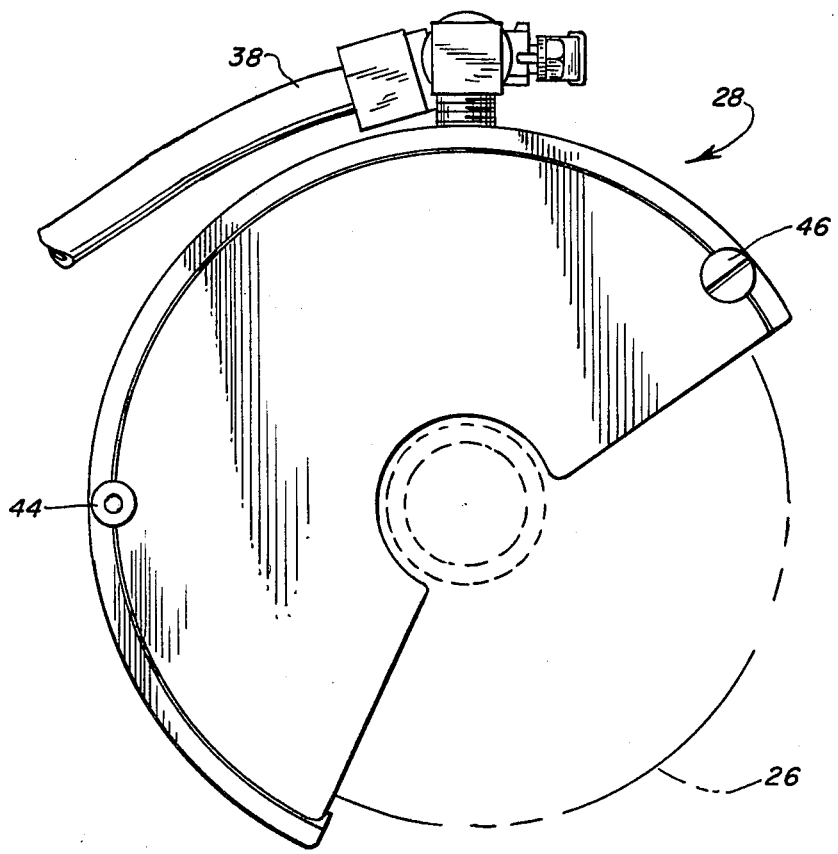
FIG. 2 is a fragmentary detail side elevational view showing a cutter wheel or blade in combination with a blade guard modified to incorporate a coolant system in accordance with the present invention.
Figure 3:
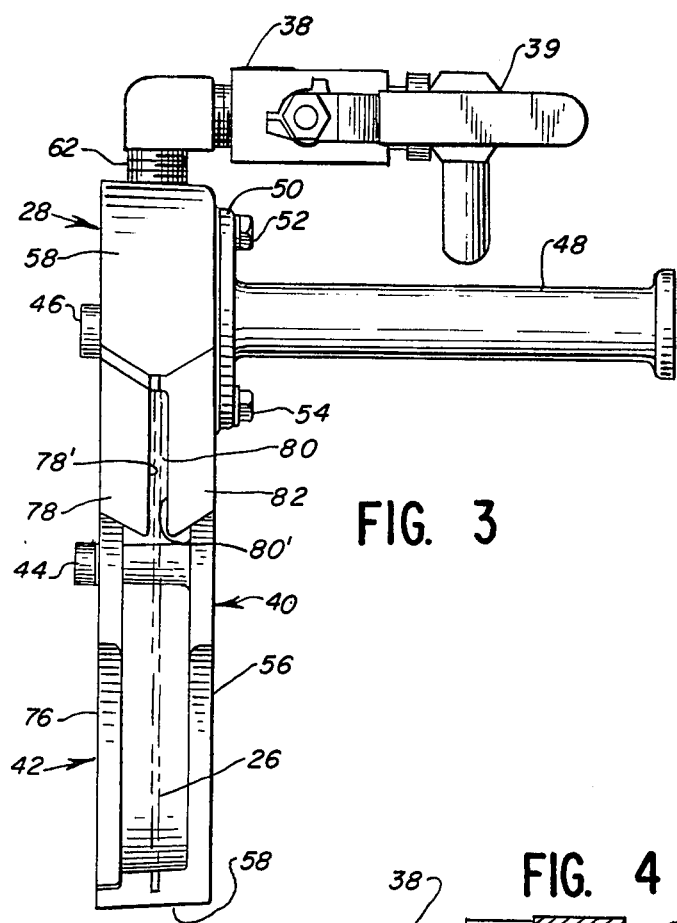
FIG. 3 is a fragmentary detail front elevational view of the cutting wheel and blade guard assembly shown in FIG. 2.

FIGS. 2 and 3 illustrate the blade guard assembly 28, rotatable cutting blade 26, and the coolant supply tube 38 connected to the upper end of the blade guard assembly. The blade guard assembly 28 includes a right-hand blade guard section 40 and a left-hand blade guard section 42 which are assembled in face-to-face relation as shown in FIG. 3.

FIG. 2 shows a hinge screw 44 which is threaded into the right-hand blade guard section 40. During assembly the left-hand blade guard 42 is positioned so its outer edge projects beneath the hinge screw 44, and then a thumb screw 46 is inserted through a small opening near the periphery of the left-hand blade guard 42 and threaded into the right-hand blade guard 40 to secure the two guard sections in assembled relation. FIG. 3 further shows a blade guard support shaft 48 having a flange 50 on one end which is secured to the outside of the right-hand blade guard section 40 by screws 52 and 54, the opposite end being rigidly mounted in the housing wall 32.

Figure 5:
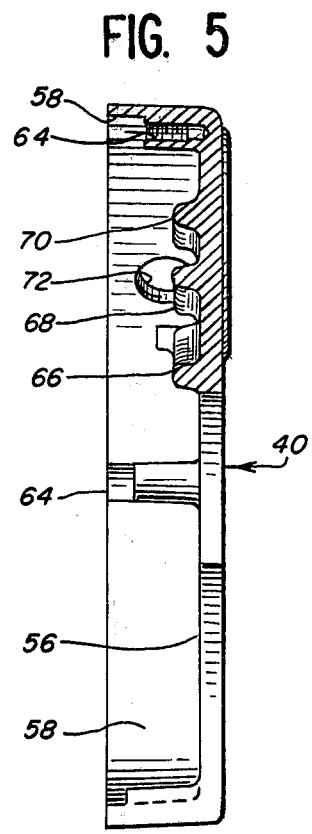
FIG. 5 is a detail sectional view taken approximately along the line 5—5 of FIG. 4.
Figure 4:
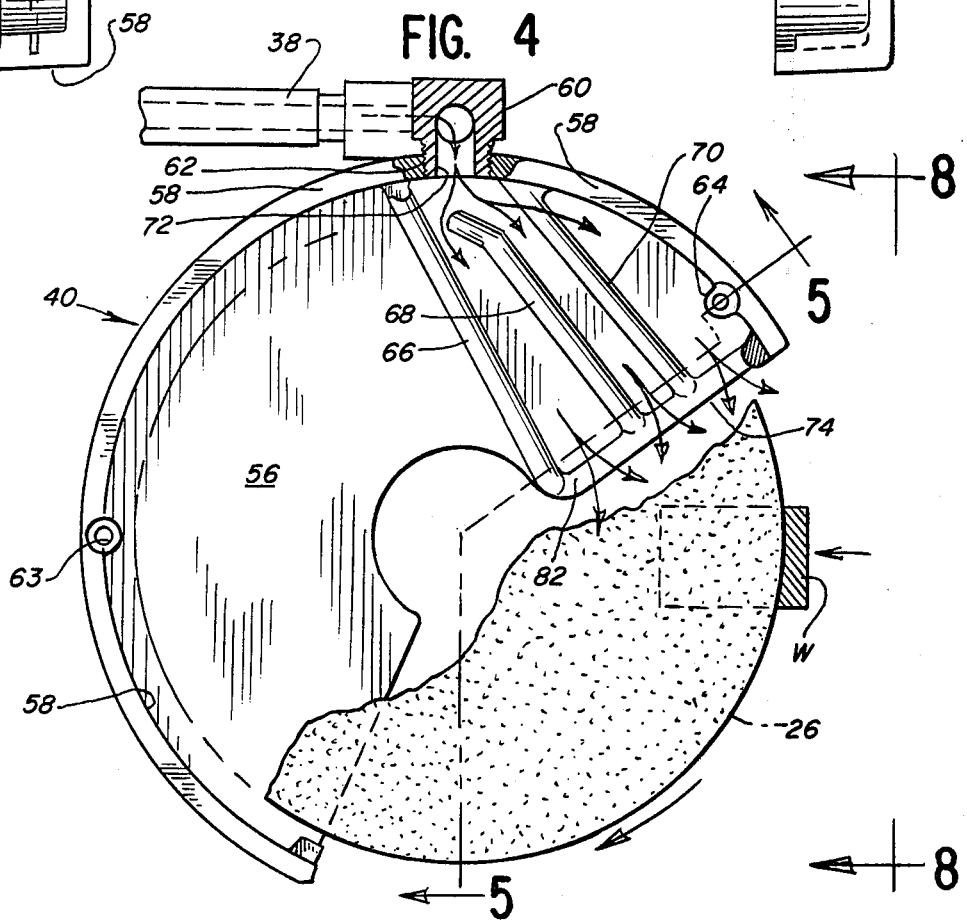
FIG. 4 is a fragmentary detail elevational view showing the inside of the right-hand half of the blade cover of FIG. 3 so as to illustrate vanes which are cast on the inside wall of the blade guard.

Reference is now made to FIGS. 4 and 5 which illustrate the inside wall of the right-hand blade cover section 40. FIG. 4 also shows a rotatable cutting blade 26 and a workpiece W to illustrate the relative position of such components. The right-hand blade cover section 40 includes a side wall 56 which is arcuate but extends for an arc only slightly in excess of 180 degrees so that the entire top and rear portions of the blade 26 are covered but the lower front and bottom portions are exposed. The side wall 56 is surrounded by an annular rim 58 which extends around the entire peripheral edge of the plate 56 and projects axially inwardly toward the left-hand blade cover section 42 as viewed in FIG. 3.

At the upper end of the blade cover section 40 as shown in FIG. 4 there is provided a threaded opening 60 which receives a downwardly directed threaded end 62 of the coolant supply tube 38 for the purpose of directing coolant fluid down into the upper end of the blade cover section 40 approximately at the extreme top portion thereof. FIG. 4 further shows a first threaded aperture 63 for receiving the hinge screw 44 (see FIG. 2), and a second threaded aperture 64 for receiving the thumb screw 46 (see FIG. 2).

It is an important feature of the present invention that the inside of the wall 56 of the right-hand guard section 40 is provided with vanes shown at 66, 68 and 70 which in the embodiment described are cast into the wall 56. The vanes 66, 68 and 70 are generally located in the area between a coolant inlet opening 72 and an end wall 74 of the blade guard section 40 which end wall generally faces a workpiece W which is shown in a position it would occupy during a cutting operation, it being understood the workpiece would be moved along a horizontal path from right to left as viewed in FIG. 4 until it engaged the blade 26 and a desired section of the workpiece was cut off.

It will further be noted that the vanes 66, 68 and 70 are oriented so they extend generally in a direction from the coolant inlet 72 toward the position occupied by a workpiece W during a cutting operation. Of course, as explained hereinabove, the workpiece W will move from right to left as viewed in FIG. 4 during a cutting operation, but it will be noted as shown by the arrows in FIG. 4 that the area of coolant flow along and between the three vanes 66, 68 and 70 is relatively wide so that the workpiece will be bathed with coolant during the entire time it is passing through the cutting area.

FIGS. 7 and 8 illustrate the left-hand blade cover section 42 which includes a side wall 76 which, like the right-hand blade guard section 40, is arcuate but extends for an arc only slightly in excess of 180 degrees. The side wall 76 is not surrounded by an annular rim as in the case of the right-hand blade guard section. However, there is a generally straight rim portion 78 along an end wall 80 which corresponds to the end wall 74 of the right-hand blade guard 40. As shown in FIG. 3, when the two blade guard sections are assembled, the rim portion 78 on the left-hand guard section and a similar straight rim portion 82 along the end wall 74 on the right-hand section face each other but leave a space therebetween wider than the thickness of blade 26 so as to accommodate the latter.

FIG. 6 further shows an opening 84 in the peripheral edge portion of blade cover section 42 for receiving the thumb screw 46 (see FIG. 2), and a semi-circular notch 86 in a peripheral edge portion of the cover section for accommodating the hinge screw 44 (see FIG. 2).

As in the case of the right-hand cover section 40, the inside wall of the left-hand blade guard section 42 is provided with vanes shown at 88, 90 and 92 which in the embodiment described are cast into the wall 76. In a manner similar to the right-hand section 40, the vanes are located in the area between the coolant inlet 72 and the end wall 80 of the left-hand blade guard section 42, which wall generally faces a workpiece W as the latter moves through a cutting operation.

The three vanes 88, 90 and 92 cast on the inside of the wall 76 of the left-hand blade cover section 42 are located to be approximately opposed to corresponding ones of the vanes 70, 68 and 66 on the inside of the wall 56 of the right-hand blade cover section when the two sections are assembled as shown in FIG. 3. In the assembled position, in accordance with the particular preferred embodiment described herein, the opposed vanes are relatively close but do not contact one another. The space between opposing vanes may be on the same order as the space afforded between the inner edges 78' and 80' of the flanges 78 and 80 as shown in FIG. 3 to accommodate the blade 26. However, variations in such spacing are well within the scope of the present invention.

FIG. 8 is a front detail schematic view showing that the coolant inlet 72 is located in symmetrical fashion directly above the rotatable cutter blade 26 with the result that coolant fluid is divided by the blade and approximately half of the coolant flows along each side of the blade 26.

In addition to the features described above, it will be noted that as viewed in FIG. 4 the blade 26 rotates in a clockwise direction so the blade itself generally moves in the same direction as the desired coolant flow from the inlet 72 to the workpiece W. Accordingly, the rotating blade assists in providing the desired flow of coolant to the workpiece W.

What is claimed is:

1. A coolant supply system for use with a cutter of the type having a vertically disposed motor-driven rotatable cutter wheel, a workpiece holder which is movable to feed a workpiece into engagement with a front portion of the cutter wheel for a cutting operation, and a wheel guard, the improvement comprising, in combination, wheel guard means covering an upper portion of said cutter wheel while leaving a front portion exposed for engagement with a workpiece, said wheel guard means having a top wall and a pair of opposed side wall portions which cover opposite sides of the upper portion of said cutter wheel, a coolant inlet opening formed in said wheel guard means generally above said cutter wheel and located to distribute coolant downwardly on both sides of said wheel within a space defined by said opposed side wall portions, and a coolant supply conduit connected to said coolant opening for supplying coolant to the interior of said wheel guard means on both sides of said cutter wheel, at least one of said wheel guard side wall portions has directional vanes formed on the inside thereof for directing coolant from said coolant inlet opening toward a front exposed portion of said cutter wheel where the same is engaged by a workpiece to be cut.

2. A coolant supply system as defined in claim 1 where each of said wheel guard side wall portions has directional vanes formed on the inside thereof for directing coolant from said coolant inlet opening toward a front exposed portion of said cutter wheel.

3. A coolant supply system as defined in claim 2 where the directional vanes formed on the inside of one of said side walls portions are in approximately opposed relation to corresponding ones of the directional vanes formed on the inside of the other of said side wall portions.

4. A cutter comprising, in combination, a vertically disposed motor-driven rotatable cutter wheel, a workpiece holder which is movable along a straight approximately horizontal path to feed a workpiece into an exposed front portion of said cutter wheel, said cutter wheel being rotatable in a downward direction relative to such a workpiece, wheel guard means covering an upper portion of said cutter wheel while leaving a lower front portion exposed for engagement with a workpiece, said wheel guard means having a top wall and a pair of opposed side wall portions which cover opposite sides of the upper portion of said cutter wheel, a coolant inlet opening formed in said wheel guard means generally above said cutter wheel and located to distribute coolant downwardly on both sides of said wheel within a space defined by said opposed side wall portions, and a coolant supply conduit connected to said coolant opening for supplying coolant to the interior of said wheel guard means on both sides of said cutter wheel, at least one of said wheel guard side wall portions has directional vanes formed on the inside thereof for directing coolant from said coolant inlet opening toward a front exposed portion of said cutter wheel where the same is engaged by a workpiece to be cut.

5. A rotating blade cutter as defined in claim 4 where each of said wheel guard side wall portions has directional vanes formed on the inside thereof for directing coolant from said coolant inlet opening toward a front exposed portion of said cutter wheel.

6. A rotating blade cutter as defined in claim 5 where the directional vanes formed on the inside of one of said side wall portions are in approximately opposed relation to corresponding ones of the directional vanes formed on the inside of the other of said side wall portions.

7. A rotating blade cutter as defined in claim 4 where said directional vanes are cast on the inside of said one side wall portion.

8. A rotating blade cutter as defined in claim 4 where at least three directional vanes are formed on the inside of said one side wall portion, said vanes being spaced apart from one another and approximately parallel.

* * * * *